April 28, 1959  R. W. LOUGHLIN  2,884,240
TENSION SPRING
Filed Jan. 7, 1955  2 Sheets-Sheet 1
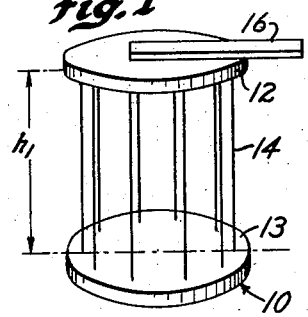
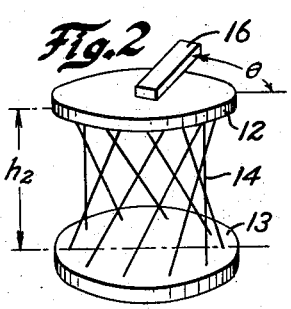
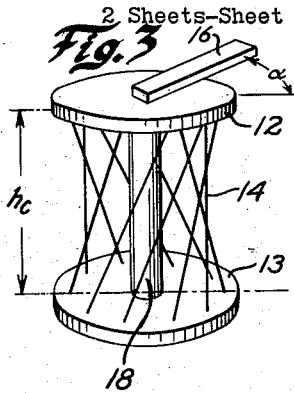
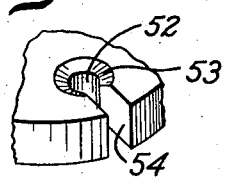
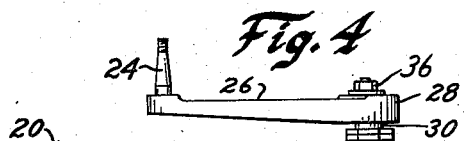
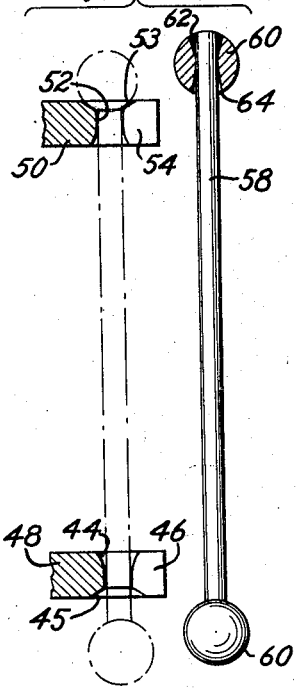
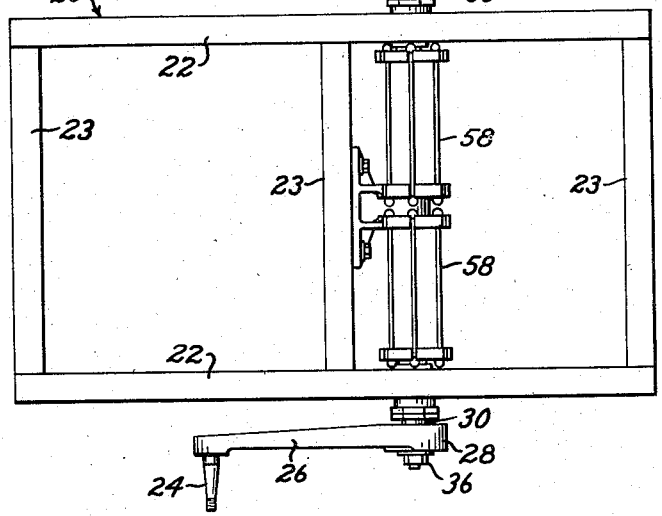
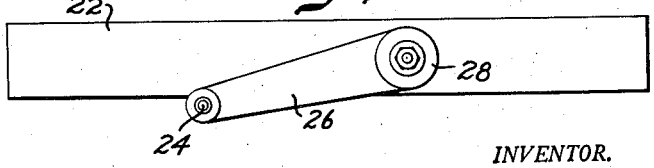
INVENTOR.
Robert W. Loughlin
BY
Morgan, Finnegan, Durham & Pine
ATTORNEYS

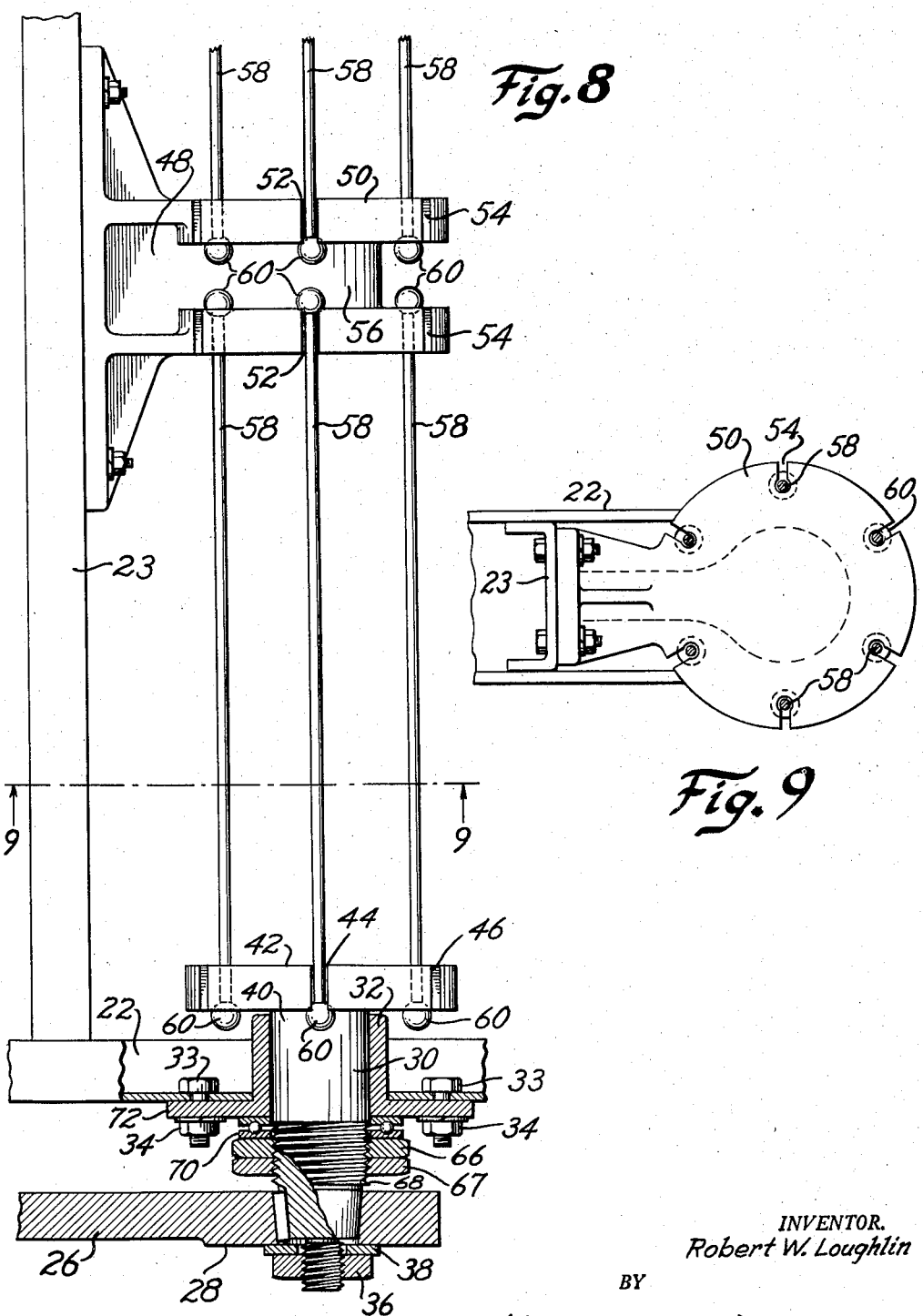

United States Patent Office 2,884,240
Patented Apr. 28, 1959

2,884,240

TENSION SPRING

Robert W. Loughlin, Mountain Lakes, N.J.

Application January 7, 1955, Serial No. 480,483

10 Claims. (Cl. 267—15)

This invention relates to springs and more particularly to an improved form of tension spring.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present invention has for its object the provision of a tension spring which will be adaptable to applications having a rotary turning moment. It is also an object of the invention to provide a spring for such applications that is lighter and has greater energy absorbing capacity than previously known torsion springs.

Heretofore torsion springs have been the most efficient type of spring for applications having a turning moment. Generally the torsion spring comprises a cylinder, either solid or hollow, fixed at one end and movable at the opposite end. A rotational load is applied to the movable end and the torsional deflection of the movable end with respect to the fixed end absorbs the energy of the load and gives the spring effect.

In the applicant's spring the connectors comprise a plurality of members which are relatively strong in tension. Additionally, means are provided whereby the disks are maintained at a constant spaced distance during rotation of the movable disk. As a result, the connecting members stretch to accommodate the rotation of the disk and are thereby placed under a tension stress which absorbs the energy of the disk's rotation. The applicant's connecting members are able to absorb a greater amount of energy than the connecting members in a torsional spring because only in tension can every fiber of the material be fully utilized as an energy absorber. The torsion spring, on the other hand, distributes the load from a maximum at the outside surface of the connector to zero at the axis of the torsional force so that full advantage can only be taken of those fibers at the outside surface. By computation it can be shown that the energy-absorbing capacity of the connectors in tension is increased more than three times over the energy-absorbing capacity of the same connectors in torsion. For this reason the adaptation of the applicant's tension spring to applications involving rotational turning moments enables the spring to be constructed of lighter material without sacrificing any strength.

It will be understood that the foregoing general descirption and the following detailed description as well are exemplary and explanatory of the invention but are not restrictive thereof.

Of the drawings:

Figs. 1 and 2 are for the purpose of aiding in the understanding of the applicant's invention and are schematic views of a stationary disk and a rotatable disk joined by a plurality of flexible connectors. In Fig. 1 the upper disk is unloaded while in Fig. 2 the upper disk is shown after a load has been applied to it.

Fig. 3 is a schematic view showing a spring, constructed in accordance with the teachings of the applicant's invention, under the application of a load;

Fig. 4 is a plan view of a two-wheel automobile trailer chassis provided with a practical embodiment of the applicant's form of tension spring;

Fig. 5 is a side elevation of the trailer chassis;

Fig. 6 is a perspective view of a portion of a disk showing the openings which receive the connecting members;

Fig. 7 is a detail view showing the connecting members and the method of retaining them in the disks;

Fig. 8 is an enlarged view, partly in section, of one side of the trailer side of the trailer chassis shown in Fig. 4; and Fig. 9 is a sectional view taken along the line 9—9 in Fig. 8 looking in the direction of the arrows.

Referring now to the drawings for a detailed description of the invention and, first, to Fig. 1, there is shown a pair of circular parallel disks 12, 13 joined together by a plurality of connectors 14 and normally spaced from each other at the distance $h_1$. One disk 12, the upper disk shown in the figure, is rotatable with respect to the other disk and is provided with a lever arm 16 to which a load may be applied so as to effect the rotation of the disk 12. In Fig. 2 the disk 12 is shown with such a load applied to the lever 16. The upper disk 12 has been rotated through the angle $\theta$ thereby rotating the upper end portions of the connecting members 14 and twisting them axially. With the upper end portions of the connectors 14 rotated in a counterclockwise direction the disks 12, 13 are moved toward each other so as to permit the cables to accommodate themselves to the new position and the distance between disks 12, 13 is reduced to $h_2$.

Fig. 3 is a schematic representation of the applicant's improved form of tension spring in which the circular disks 12, 13 are held in a constant spaced relationship with one another by means of the column 18 mounted between the central portions of each disk. The column 18 is rotatably secured to the upper or rotatable disk 12 so as to permit rotation of the upper disk with respect to the lower disk. Upon application of a load, the lever 16 rotates the disk 12 through the angle $\alpha$. The upper end portions of the connecting members 14 are rotated with the disk 12 but, because the distance between the disks 12, 13 is held constant, the connectors 14 have to stretch to accommodate the rotation of the upper disk and, in so doing, are placed under a tensile stress.

The structure shown in Fig. 4 is an illustrative application of the applicant's invention in which the tension spring is utilized to absorb the road shocks for a two-wheeled automotive trailer. The trailer chassis generally comprises a rectangular frame 20 made up of the usual longitudinal and transverse beam members 22, 23. The wheels (not shown) for the trailer are mounted on tapered axles 24 secured to the outside end portions of the arms 26. At its opposite end 28, each arm 26, is keyed to a relatively short axle member 30 journaled within a bearing 32 removably secured to the side frame 22 of the trailer chassis by means of the bolts 33 and nuts 34. A lock nut 36 and washer 38 retain the arm 26 on the axle 30. At its inner end 40 the axle is provided with a generally circular flange member 42 having a plurality of openings 44 equally spaced about the periphery thereof. Each of the openings 44 is connected with the periphery by means of a slot 46 and is countersunk at its outer face. Flange 42 corresponds to the rotatable disk 12 of Fig. 3.

A bracket 48 is secured to the center of a cross-piece 23 and is formed so as to provide a pair of flange members 50 similar in shape to the flange member 42 on the inner end of the axle 30 and having a plurality of openings 52 equally spaced about the flange 50 adjacent the periphery thereof and connected by slots 54 with the outer end surfaces of the flange. The openings 52 and 44 are flared inwardly so as to avoid projections which would cause stress concentrations in the connectors upon relative rotation of the disks. A web 56 is provided to stiffen the bracket 48 and joins the central portions of the flanges 50 which correspond to the stationary disk 13 in Fig. 3. A plurality of connectors 58, made from high tensile strength monofilament steel wire, are each mounted with one end in the inner flange 42 on the axle 30, and the opposite end within a flange 50 on the bracket 48. The connectors 58 carry large end portions 60 in the shape of spheres having openings 62 therein to receive the connector and being joined thereto by having one half of the opening between the cable 58 and the sphere 60 filled as by welding. Opening 62 tapers outwardly at 64 so as to permit the connector a certain freedom for bending motion.

The connectors 58 are first inserted within the slots 46, 54 and openings 44, 52 in the brackets 42, 50 on the axle 30 and the bracket 48 so that the spheres 60 on the ends of the connectors 58 abut the tapered surfaces 45, 53. Spheres 60 are not fixedly secured to the brackets 42, 50 but may move axially with respect thereto. Thereafter, the flange 42 on the axle 30 is drawn away from the flange 50 on the bracket 48 so as to tighten the connectors 58 and to put them under an initial stress. This is accomplished by means of the nuts 66, 67 threaded onto the threaded portion 68 of the axle 30, the inner nut 66 of which bears against the outer race of the thrust bearing 70 adjacent the flange 72 of the bearing 32. After the lock nuts 66, 67 have ben tightened to the proper degree the rotation of the arms 26 caused by the bumping of the wheels of the trailer over the road bed cause the flanges 42 to be rotated and the connectors 58 placed under tension to absorb the shocks.

The column 18, shown in Fig. 3, is omitted in the practical application shown in Fig. 4 as the transverse member 23, to which the bracket 48 is bolted, acts as a compression member and maintains the flanges 50 at a constant distance from the flanges 42.

While the applicant has disclosed and described an illustrative embodiment of his invention utilizing high tensile strength steel wire other materials could be used for the connectors according to the particular application. For instance, in certain applications where the forces involved are not of great magnitude the connectors may be formed from nylon or other like material. Thus springs made wholly of non-metallic materials can be provided for applications where metals are not practical because of corrosion, electrical conductivity or other factors, such non-metallic springs being of sizes and strength heretofore not obtainable with non-metallic parts.

Further the method of mounting the connectors in the disks may take other forms, the illustrated method being merely a preferred embodiment. For example the spheres 60 on the ends of the connectors could be fixedly secured to the disks. Upon rotation of the movable disk some torsional stresses would be set up in the connectors which would aid the tension stresses in absorbing the energy of the load applied to the spring.

The invention in its broader aspects is not limited to the specific mechanisms shown and described but departures may be made therefrom within the scope of the accompanying claims without departing from the principles of the invention and without sacrificing its chief advantages.

I claim:

1. A tension spring unit comprising a pair of disk-like elements supported in spaced face to face relation, one of said elements being rotatable relative to the other of said elements, at least one rod-like elastic connector lying between the elements and disposed parallel to the axis thereof, said rod being joined to the elements at its ends, means for rotating one of said elements to stretch and apply a tensile load to said connector, and means for preventing said elements from moving toward one another during relative rotation thereof.

2. A tension spring unit comprising a pair of disc-like elements supported in spaced face to face relation, one of said elements being rotatable relative to the other of said elements, a plurality of rod-like elastic connectors lying between the elements and disposed parallel to the axis thereof, said rods being joined to the elements at their ends, means for rotating one of said elements to stretch and apply a tensile load to said connectors, and means for preventing said elements from moving toward one another during relative rotation thereof.

3. A tension spring as set forth in claim 1 in which the connecting member is of low torsional elasticity and of high tensile strength.

4. A tension spring as set forth in claim 1 in which the connecting member comprises a steel wire.

5. A tension spring as set forth in claim 1 in which the connecting member is non-metallic.

6. A tension spring as set forth in claim 1 in which the means for preventing the members from moving toward one another comprises a rigid column fixedly joined to one member and rotatably secured to the other of said members.

7. A tension spring as set forth in claim 2 in which the connecting members are of low torsional elasticity and of high tensile strength.

8. A tension spring as set forth in claim 2 in which the connecting members comprise steel wires.

9. A tension spring as set forth in claim 2 in which the connecting members are non-metallic.

10. A tension spring as set forth in claim 2 in which the means for preventing the members from moving toward one another comprises a rigid column fixedly joined to one member and rotatably secured to the other of said members.

References Cited in the file of this patent

UNITED STATES PATENTS

| 478,735 | Boswell | July 12, 1892 |
| 1,232,922 | Hobbs | July 10, 1917 |
| 1,602,022 | Hetland | Oct. 5, 1926 |
| 1,640,670 | Schaeffer | Aug. 30, 1927 |
| 2,184,815 | Reynolds | Dec. 26, 1939 |

FOREIGN PATENTS

| 876,075 | France | July 20, 1942 |
| 881,390 | France | Jan. 22, 1943 |